(12) United States Patent
Neary et al.

(10) Patent No.: US 12,372,369 B1
(45) Date of Patent: Jul. 29, 2025

(54) DETECTING AND FIXING MAP ARTIFACTS

(71) Applicant: SB Technology, Inc., Tarrytown, NY (US)

(72) Inventors: Patrick Loughrin Neary, Hyde Park, UT (US); Kimberly Margaret Moore, Redwood City, CA (US); Regupathi Angappan, Baltimore, MD (US)

(73) Assignee: SB Technology, Inc., Tarrytown, NY (US)

( * ) Notice: Subject to any disclaimer, the term of this patent is extended or adjusted under 35 U.S.C. 154(b) by 0 days.

(21) Appl. No.: 18/770,321

(22) Filed: Jul. 11, 2024

(51) Int. Cl.
  *G01C 21/00* (2006.01)
  *G01C 21/08* (2006.01)

(52) U.S. Cl.
  CPC ......... *G01C 21/3804* (2020.08); *G01C 21/08* (2013.01)

(58) Field of Classification Search
  None
  See application file for complete search history.

(56) References Cited

U.S. PATENT DOCUMENTS

| | | | |
|---|---|---|---|
| 10,302,713 B2 * | 5/2019 | Popescu | G01R 33/5611 |
| 12,067,652 B2 * | 8/2024 | Schuelke | G06N 3/084 |
| 2005/0043774 A1 * | 2/2005 | Devlin | A61B 5/6814 607/45 |
| 2017/0372155 A1 * | 12/2017 | Odry | G06F 18/28 |
| 2019/0128989 A1 * | 5/2019 | Braun | G06N 5/046 |
| 2019/0377047 A1 * | 12/2019 | Chen | G01R 33/5608 |
| 2020/0054888 A1 * | 2/2020 | Etkin | A61B 5/316 |
| 2021/0103287 A1 * | 4/2021 | Shapira | G05D 1/81 |
| 2022/0066456 A1 * | 3/2022 | Ebrahimi Afrouzi | G06F 3/04883 |
| 2022/0291692 A1 * | 9/2022 | Drinkard | G01C 21/3804 |
| 2024/0012171 A1 * | 1/2024 | Anderson | B64G 1/32 |
| 2024/0125871 A1 * | 4/2024 | Chernyy | G01R 33/02 |
| 2024/0193827 A1 * | 6/2024 | Persson | G06T 11/005 |
| 2024/0212118 A1 * | 6/2024 | Liu | G06V 10/761 |
| 2024/0295619 A1 * | 9/2024 | Seevinck | G01R 33/50 |
| 2024/0306969 A1 * | 9/2024 | Iwata | G01R 33/0206 |

OTHER PUBLICATIONS

Encyclopedia of Geomagnetism and Paleomagnetism, Gubbins et al. (eds.), 2007, 1061 pages.

\* cited by examiner

*Primary Examiner* — Daniel L Greene
*Assistant Examiner* — Robert L Pinkerton
(74) *Attorney, Agent, or Firm* — Fish & Richardson P.C.

(57) ABSTRACT

Example computer-implemented methods and systems for detecting and removing map artifacts are disclosed. One example computer-implemented method includes obtaining a magnetic map of a region. One or more areas in the magnetic map are determined based on a first machine learning model, where each of the one or more areas includes one or more artifacts in the magnetic map. The one or more areas are determined by generating, based on the first machine learning model and the magnetic map, a second map by the first machine learning model, and comparing the second map with the magnetic map. The one or more artifacts in each of the one or more areas are removed from the magnetic map.

17 Claims, 11 Drawing Sheets

DETECTING AND FIXING MAP ARTIFACTS

TECHNICAL FIELD

The present disclosure relates to computer-implemented methods and systems for detecting and fixing map artifacts.

BACKGROUND

High fidelity geological and/or geophysical field maps, for example, Earth's crustal magnetic fields maps, are used across a variety of applications and fields. Artifacts in geological and/or geophysical field maps can come from different sources, for example, errors in positioning of the maps, quality issues of the sensors (e.g., magnetometers) used in surveys of different regions, and/or assortment of regional maps created over time with different resolutions and qualities.

SUMMARY

The present disclosure involves computer-implemented methods and systems for detecting and fixing map artifacts. One example computer-implemented method includes obtaining a magnetic map of a region. One or more areas in the magnetic map are determined based on a first machine learning model, where each of the one or more areas includes one or more artifacts in the magnetic map. The one or more areas are determined by generating, based on the first machine learning model and the magnetic map, a second map by the first machine learning model, and comparing the second map with the magnetic map. The one or more artifacts in each of the one or more areas are removed from the magnetic map.

The previously described implementation is implementable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium. The foregoing and other embodiments can each optionally include one or more of the following features, alone or in combination. In particular, one embodiment includes all the following features in combination.

In some implementations, removing the one or more artifacts includes replacing map values associated with each of the one or more artifacts with a respective set of revised map values.

In some implementations, the one or more artifacts are sent to a user, and the respective set of revised map values for each of the one or more artifacts is received from the user.

In some implementations, sending the one or more artifacts to the user includes displaying on a graphic user interface (GUI) the one or more artifacts.

In some implementations, removing the one or more artifacts includes determining, based on a second machine learning model, the respective set of revised map values for each of the one or more artifacts, and replacing the map values associated with each of the one or more artifacts with the respective set of revised map values.

In some implementations, the second machine learning model includes a variational autoencoder that takes as input the magnetic map and processes the one or more artifacts in the magnetic map to generate the respective set of revised map values for each of the one or more artifacts.

In some implementations, training the second machine learning model based on multiple magnetic maps that are free of artifacts and multiple magnetic maps that include artifacts.

In some implementations, the second machine learning model includes a generative adversarial network (GAN) that processes the one or more artifacts in the magnetic map to generate the respective set of revised map values for each of the one or more artifacts.

In some implementations, multiple synthetic magnetic maps are generated based on the magnetic map of the region and multiple simulated artifacts, and the GAN is trained based on the multiple synthetic magnetic maps.

In some implementations, the respective set of revised map values for each of the one or more artifacts is sent to a user. A respective second set of revised map values for each of the one or more artifacts is received from the user. The second machine learning model is re-trained based on the respective second set of revised map values for each of the one or more artifacts.

In some implementations, the first machine learning model includes an autoencoder, the autoencoder includes multiple encoding blocks and multiple decoding blocks, and determining the one or more areas includes processing, based on the multiple encoding blocks and the multiple decoding blocks, the magnetic map to determine the one or more areas.

In some implementations, a loss function of the autoencoder includes a similarity-based loss function.

In some implementations, the similarity-based loss function includes a structure-based similarity index or a feature-based similarity index.

In some implementations, the autoencoder is based on a convolutional neural network (CNN).

In some implementations, the first machine learning model is trained based on multiple magnetic maps that are free of artifacts and multiple magnetic maps that include artifacts.

In some implementations, an input to the first machine learning model includes the magnetic map and at least one of a topographic map or a gravity-based map of the region.

In some implementations, an output from the first machine learning model includes the one or more areas or metadata associated with the one or more areas.

The subject matter described in this specification can be implemented in particular embodiments so as to realize one or more of the following advantages. For example, the disclosed systems and methods can help remove the need for time consuming manual search of map artifacts by allowing for prioritization of remediation efforts to fix the artifacts in maps. As another example, the disclosed systems and methods can allow machine learning models used for detecting and fixing map artifacts to be re-trained based on feedback from the users regarding the fixes proposed by the machine learning models.

The details of these and other aspects and implementations of the present disclosure are set forth in the accompanying drawings and the description below. Other features, objects, and advantages of the disclosure will be apparent from the description and drawings, and from the claims.

BRIEF DESCRIPTION OF DRAWINGS

Like reference numbers and designations in the various drawings indicate like elements.

DETAILED DESCRIPTION

Geological and/or geophysical field maps may be generated as a result of splicing many maps together. Borders where maps come together can be regions for artifacts to show up, because the maps may be created with different technologies and/or at different times (e.g., many years between the creation of one map and the one next to it). Additionally, some maps were created before Global Positioning System (GPS) became operational and therefore may be shifted relative to the true locations of the geological or geophysical field. Example artifacts in maps can include pixelated edges where maps are merged, unphysical shapes such as perfect squares, different baseline values (e.g., direct current (DC) bias) of individual source surveys relative to others, map features that show a significant alignment along or perpendicular to sensor platform flight paths, with a line-like texture where certain lines stick out (suggesting a bias due to how the data was collected or leveling issues of the sensor platform), and/or isolated high magnitude spots or dipoles.

The process of identifying and fixing artifacts in geological and/or geophysical field maps can involve significant manual effort. For example, the process can include an expert opening a map and looking for artifacts visually or using frequency-based filtering methods to identify artifacts in the map, followed by writing software code to fix the artifacts, for example, by removing edges, smoothing, interpolating, and/or filtering the artifacts. This process can be a very time consuming effort. In some cases, the process of identifying map artifacts can take hours to perform, and fixing small artifacts can take weeks or even months for large areas.

This disclosure relates to systems and methods that can augment an expert by identifying artifacts and proposing potential fixes to the artifacts based on machine learning models. The expert can then apply their domain knowledge to select the fixes from those generated from the machine learning models and subsequently make updates to the map based on the selected fixes. In some cases, a first machine learning model can be used to identify artifacts in maps, and a second machine learning model can be used to propose potential fixes to the identified artifacts.

Figure 1:
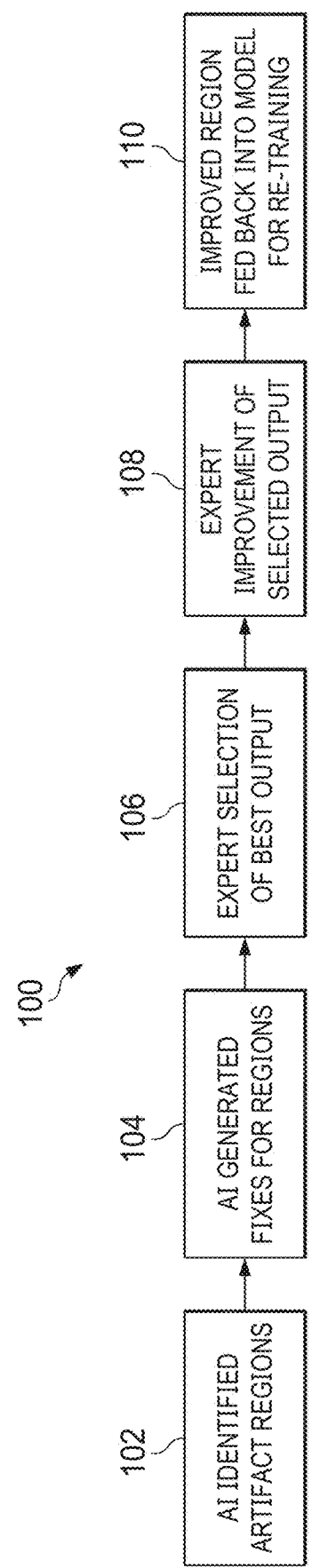
FIG. 1 illustrates an example process for detecting and fixing artifacts in a map, according to some implementations.

FIG. 1 illustrates an example process 100 for detecting and fixing artifacts in a map (also referred to as an image). For convenience, 102, 104, and 110 of process 100 will be described as being performed by a computer system having one or more computers, located in one or more locations, and programmed appropriately in accordance with this specification. An example of the computer system is the computer system 1200 illustrated in FIG. 12.

Figure 3:
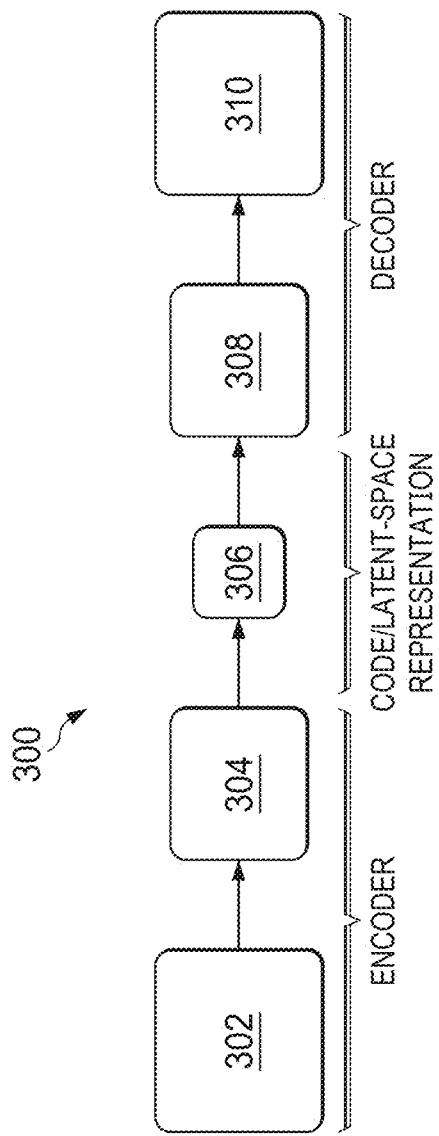
FIG. 3 illustrates an example machine learning model used to detect artifacts in a map, according to some implementations.

At 102, a computer system identifies regions in a map that have artifacts, using a machine learning model (also called an artificial intelligent (AI) model). In some implementations, the map can be a magnetic map of an area and can be the input to the machine learning model. The machine learning model can be trained to identify regions with artifacts in the map. The machine learning model can report the identified artifact regions as an output. The machine learning model can output additional metadata that includes properties related to the artifacts, for example, the severity of each of the artifacts and/or the confidence level associated with the identification of each of the artifacts. In some cases, the metadata can be in the format of a table. The identified artifact regions and the corresponding artifacts, as well as the metadata, can be combined to provide a heat map overlay showing where the artifacts exist in the map and the type and/or severity of each of the artifacts. The heat map can help remove the need for time consuming manual search of artifacts in a map by allowing for prioritization of remediation efforts to fix the artifacts. More detailed information of the machine leaning model used at 102 is provided below when FIG. 3 is described.

At 104, the computer system generates fixes for the artifact regions identified at 102, using a second machine learning model. In some implementations, the second machine learning model can be a generative machine learning model that takes the magnetic field values of the area surrounding each identified artifact as an input, and then supplies different potential fills (e.g., proposed improved or revised map values) for the area having the identified artifact. In some cases, the second machine learning model can be trained on a variety of features from magnetic field maps (or other types of geological/geophysical maps) that are evaluated (e.g., manually) to be free of artifacts (e.g., scalar or vector magnetic field maps). The map features used to train the second machine learning model can be associated with variations in the earth's magnetic field that come from variations in mineral deposits in the earth's crust. Example map features can include mountains, magnetized materials in the earth, and/or transitions to oceanic crusts. Consequently, the fills provided by the second machine learning model can be constrained by geophysical features and their characteristics, as well as methods used to generate the maps. The processing at 102 and 104 can provide significant time savings for a user (e.g., an expert) fixing the artifacts in a map. More detailed information about the second machine learning model is provided below.

At 106, a user can determine which AI generated fills from 104 can provide fixes to artifacts detected at 102, based on the user's understanding of the input map that is flagged by the computer system at 102 as having artifacts.

At 108, the use can further improve the fixes selected at 106 to generate improved regions in the input map of 102, by replacing the artifacts with expert-improved fills from 106.

At 110, the improved regions in the input map at 102 can be fed back into the machine learning models at 102 and 104 to re-train these models, for example, regarding which fixes from 104 are the most likely to be correct fixes. Additionally, as the user reviews maps and identifies artifact regions that may be missed by the machine learning model at 102, the user can select the missed regions and feed them back into the machine learning model at 102 that identifies map artifacts to continually improve the machine learning model at 102.

In some implementations, based on the needs of the user, the processing at 104 to fix the artifact regions by the computer system may not be performed. For example, the user may only use the machine learning model in 102 to identify artifact-free regions of the map and output a heat map of where artifacts exist in the map. In some cases, the identified artifact regions provide useful information to the user. For example, if new surveys are being planned in an area, the identified stitched borders in the map and the heat map from 102 showing where artifacts exist can help the user prioritize regions in the area that need to be re-mapped.

Figure 2:
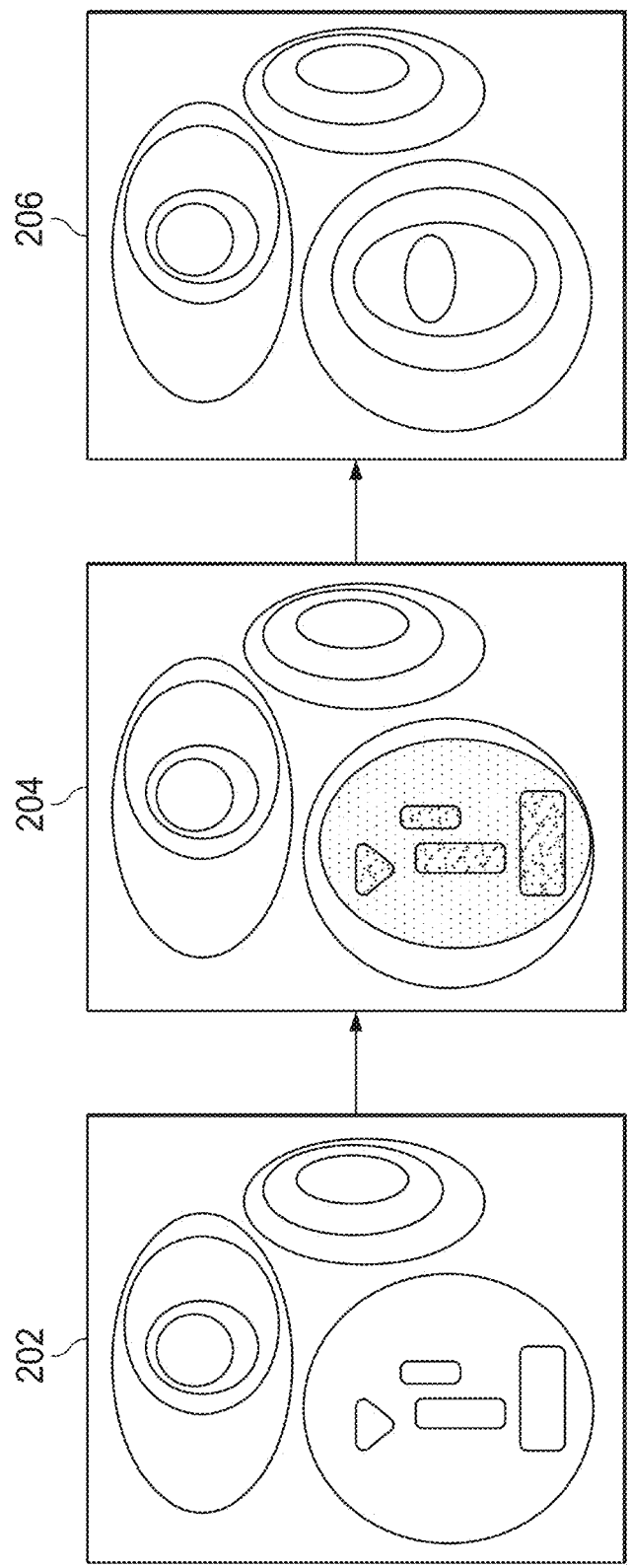
FIG. 2 illustrates example maps used in the process of FIG. 1, according to some implementations.

FIG. 2 illustrates example maps used in process 100 of FIG. 1. Map 202 is the input map at 102, where the triangles and rectangles represent artifacts in the input map, and ovals and circles represent normal gradients in the input map. Map 204 is the output map at 102, where the shaded regions (i.e., the heat map) represent artifact regions identified by the machine learning model at 102. Map 206 is the output map at 104, where the identified artifact regions in map 204 have been fixed by the second machine learning model at 104.

FIG. 3 illustrates an example machine learning model 300 used to detect artifacts in a map at 102. In some implementations, detection of anomalies (e.g., artifacts) in data can be accomplished with the use of machine learning models, for example, autoencoders. In some implementations, an autoencoder compresses an input image, filters extraneous information, and then re-expands the image based on latent-space information trained into the autoencoder. The convolution/de-convolution kernels of the autoencoder can learn spatial information including frequency content in the image and natural spatial relationships between features within the image. When the image is re-expanded from the middle layer (called "code" or "latent-space representation"), the trained relationships represented by the convolution/de-convolution kernels are used to reconstruct the image.

In some cases, the natural spatial relationships between features in a magnetic field map are associated with magnetic anomalies caused by mineral deposits and/or other natural phenomena. While mineral distributions may change quickly, the changes are not abrupt. Therefore mineral deposits and/or natural formations change smoothly. In regions of the magnetic field map where maps have been spliced together, there can be lines or other geometric shapes (i.e., artifacts) on the boundaries where the maps come together. The lines or other geometric shapes on the boundaries represent abrupt changes (i.e., artifacts) in a magnetic field map and are examples where the smooth natural transition of mineral distributions is violated.

In some cases, an example region in a magnetic field map that has natural frequency information is seafloor spreading stripes. The example region has natural frequencies occurring in geospatial data, due to the spreading velocities of the crust (e.g., 1-20 cm/year) and the frequency of geomagnetic reversals (e.g., $10,000s$ to millions of years), where the north and south magnetic poles swap. The geomagnetic reversals create a "striped" pattern of alternating north/south bands.

In some cases, mineral deposits in the earth's crust follow the three-dimensional (3D) shapes of terrain (including crustal thickness), which have natural frequency information. While there may occasionally be sharp lines in artifact-free magnetic field maps, the sharp lines are not perfect squares or pixelated edges.

In some implementations, machine learning model 300 can be an autoencoder. As shown in FIG. 3, the machine learning model can include an encoder that includes input layer 302 that receives the map and one or more layers 304, a code (i.e., latent-space representation layer) 306, and a decoder that includes one or more layers 308 and output layer 310 that produces an output map. The one or more layers 304 in the encoder can compress the input map to produce code 306 that represents the input map with a dimensionality lower than that of the input map. The one or more layers 308 can reconstruct the input map from code 306. Once the image is reconstructed at output layer 310 of the autoencoder, the input image and the output image can be compared (e.g., differenced). The autoencoder can be trained with images from maps that are known to be artifact free. Therefore, the trained autoencoder is embedded with the natural spatial relationships between features that are present in the artifact free maps.

Figure 4:
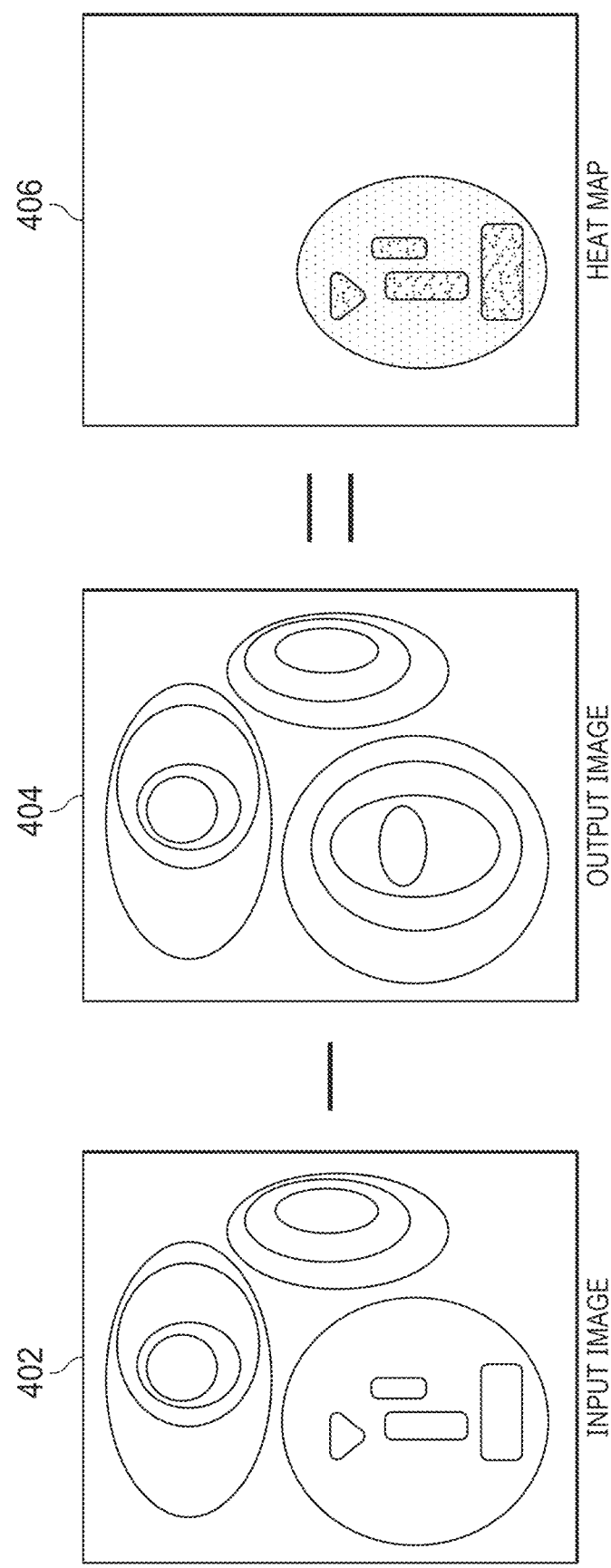
FIG. 4 illustrates an example of generating a per-pixel heat map by taking a difference between the input image and the output image of an autoencoder, according to some implementations.

In some implementations, when a map with artifacts is used as the input to the autoencoder, the autoencoder can output what the map should look like. Taking a difference between the input image and the output image can create a per-pixel heat map. FIG. 4 illustrates an example of generating a per-pixel heat map 406 by taking a difference between the input image 402 and the output image 404 of an autoencoder.

In some implementations, when a map without artifacts is used as the input to the autoencoder, there can be a small difference between the input image and the output image of the autoencoder. Thresholds can be used to identify different degrees of distortion and/or anomalies within the map.

In some implementations, thresholding to differentiate the difference between an input map and output map can be either fixed or statistically determined. For fixed thresholding, three or more thresholds can be selected to show low, medium, and high threshold categories of artifact magnitude. For statistical thresholding, z-scores can be determined for different regions of the differenced image, then the z-scores can be used to establish an expected baseline difference, and artifact degrees/thresholds can be determined from the expected baseline difference. Statistical thresholding can account for maps having different number of artifacts and/or resolutions. Consequently maps with more artifacts can be filtered as the maps are processed by the autoencoder, and maps with less artifacts can have less filtering and/or less differences between the input and output images. Therefore, the average noise over the resulting, differenced image can be different between the more artifacts map scenario and the less artifacts map scenario. By statistically sampling the input/output differenced maps, the autoencoder can learn what is considered normal in the maps and then use that information to identify the artifacts in a new map, and then categorize the artifacts and display the output of the autoencoder as a heat map, for example, heat map 406 in FIG. 4.

In some implementations, the autoencoder can be based on a convolutional neural network (CNN). The number of encoding blocks and decoding blocks in the autoencoder can depend on the size of the image. For example, the size of the latent-space representation layer 306 can range from 128× 128 to 512×512. Compression of the input image from one layer to the next in 304 can reduce the image size by around half and, similarly, the decoder can expand the image size by around two times from one layer to the next in 308.

In some implementations, the number of layers in 304 in the encoder and the number of layers in 308 in the decoder can each be two to four. The outer layers in 304 or 308 can have larger kernel sizes (e.g., 13×13). The inner layers in 304 or 308 can have smaller kernel sizes (e.g., 3×3 or 5×5). An example activation function in the autoencoder is a rectified linear unit (ReLu).

An example loss function is a similarity-based loss function (e.g., structure similarity index or feature-based similarity index) or a root mean squared error (RMSE)-based loss function.

As described earlier, at 104, multiple machine learning models can be used to generate fixes to artifacts detected by machine learning model 300. In some implementations, an example machine learning model used at 104 can be an autoencoder (or variational autoencoder), for example, the autoencoder used at 102. The input image to the autoencoder used at 104 can be compressed (i.e., encoded) in the encoder to generate a code (i.e., latent-space representation) of the input image, then the code can be decoded in the decoder to generate the output image of the autoencoder. The output image can be one option presented to the user (e.g., an expert) for fixing the artifacts detected at 102.

In some implementations, another example machine learning model used at 104 can be a generative adversarial network (GAN). A GAN can include two networks, a generator and a discriminator. The generator can take an input image from a set of original images and modify it while the discriminator can determine if the output image is part of the set of original images. The GAN can be trained by modifying the original images in a number of ways to generate input images to train the GAN. For example, noise can be added to the original images, artifacts reflecting those seen in actual magnetic maps can be added to the original images, and/or holes can be cut out of the original images, where the holes can be of random shapes that can mimic the heat map areas containing artifacts. In some cases, a library of shapes can be created from running heat map code and saving off the heat maps. The heat maps can then be used as masks applied to known high quality images (e.g., images without artifacts) and translated to different parts of the known high quality images to create a training set of input images to the GAN. In some implementations, 20,000 to 30,000 images can be used for training the GAN and/or the encoder models in autoencoders.

In some cases, heat maps can provide a visual indication of where anomalies in a map may lie. To produce a heat map for a geological or geophysical field map (e.g., a magnetic map), an autoencoder can be trained by compressing and re-expanding the map. The output from the autoencoder can be subtracted from the input to the autoencoder. Large differences between the input and the output of the autoencoder can be highlighted with a heat map. The heat map can contain large values showing up on a red scale (or a similar scale), where attention is drawn to the regions where there may be an issue. A library of heat maps can contain examples of issues that occur in real geological or geophysical field maps and can be applied to artifact-free images to expand the training set of a machine learning model (e.g., the GAN used at 104). In some cases, a library or prioritized database of heat maps can provide recommended areas to fix a map that has artifacts.

In some implementations, once the GAN is trained, input images that are flagged at 102 as having artifacts can be passed through the GAN at 104. The output images from the GAN at 104 can be provided to the user (e.g., an expert) alongside the output images from the autoencoder at 104.

In some implementations, additional GANs and/or autoencoders can be created to generate fixes to artifacts detected by machine learning model 300, by including additional unique input images to the networks used at 104. For example, topographic maps and/or gravity-based maps can correlate with anomaly magnetic field maps for corresponding regions. If one or more of the topographic maps and/or gravity-based maps are provided as additional input maps to the networks at 102 and/or 104, each of the networks can learn to use the information in the additional input maps to help construct a better informed output map. Different variations of the networks at 102 and/or 104 can be trained and then the user can choose the best fixes to artifacts detected by machine learning model 300, based on the user's experience and knowledge regarding artifacts in magnetic maps.

Figure 5:
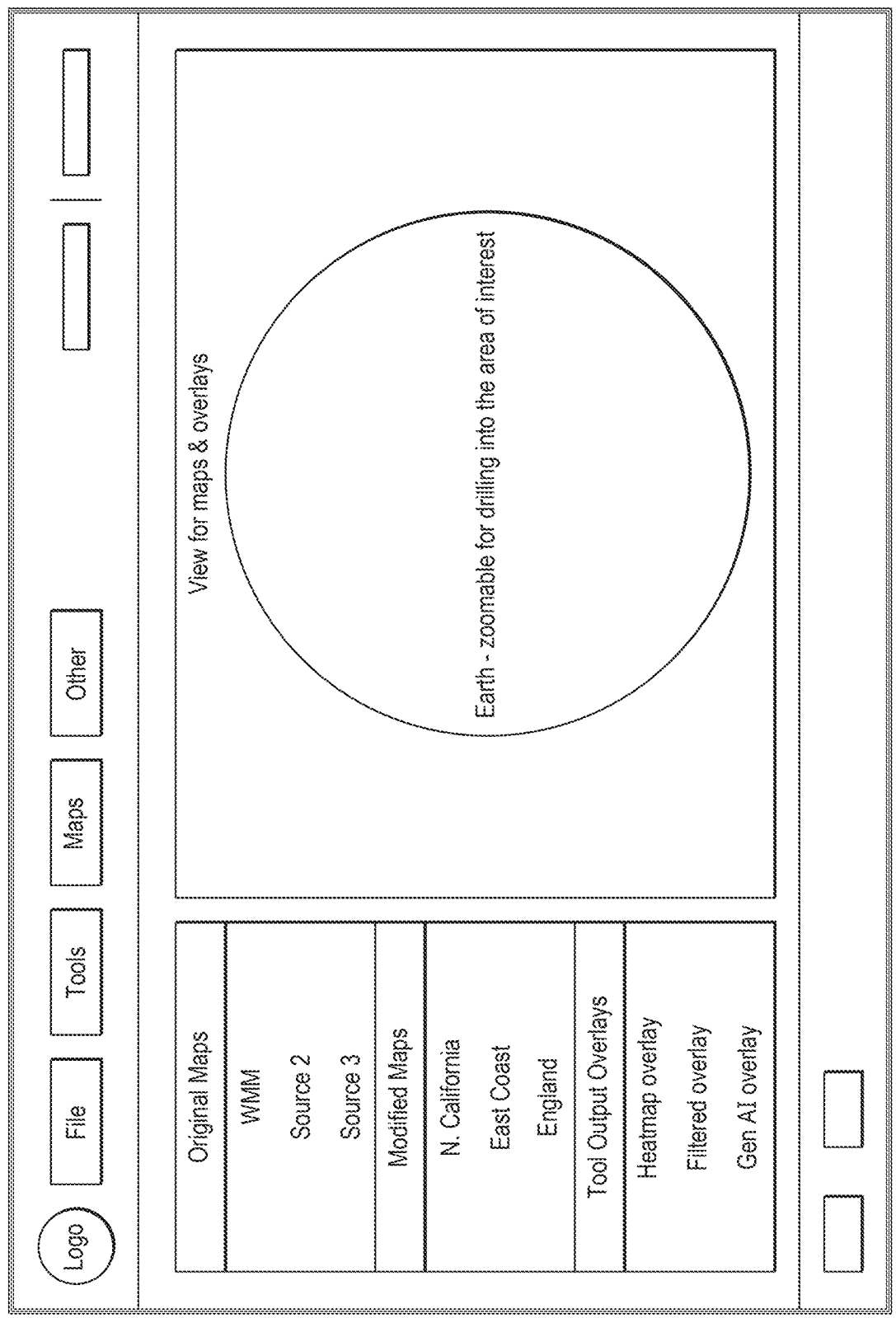
FIG. 5 illustrates an example graphical user interface (GUI) for a user to interact with maps, according to some implementations.

FIG. 5 illustrates an example graphical user interface (GUI) for a user to interact with maps. In some implementations, the maps can be magnetic maps. A standard toolbar is shown at the top of the GUI where a user can select operations to be applied to the maps. The central viewing area titled "View for maps and overlays" is where the user interacts with the maps. The shaded circle can represent a model of the earth. The user can rotate and zoom in on different areas of the earth. Once a region of interest has been zoomed in on, additional operations can be performed on the zoomed-in region of interest.

The left side of the screen includes the option of "Original Maps". This option includes maps that have been imported from a variety of different sources. The maps can be selected, loaded, and displayed in the central viewing area.

The left side of the screen includes the option of "Modified Maps". This option includes a list of map projects representing projects for different customers and/or different regions. Clicking on any of these projects would load the saved maps and display them in the central viewing area.

The left side of the screen includes the option of "Tool Output Overlays". This option includes a list of regions that the user is currently working with. For example, a user may have selected the "WMM" map in "Original Maps", a modified map project (e.g., N. California) from "Modified Maps", and now wants to investigate the selected map for artifacts. The user can select (e.g., using a mouse) regions in the selected map to apply the machine learning models in 102 and 104 and/or other tools to. When the user selects a tool in the standard toolbar at the top of the GUI to apply to the selected regions, an overlay can be created to show what the selected regions would look like when the tool is applied. When the user has completed the analysis, the overlay can be merged into the map project (e.g., a map project fixing the artifacts present in the map). Alternatively, if the user is only interested in highlighting areas with artifacts, the overlay can be merged together and saved into a new project or saved as a layer associated with the "Modified Maps" projects.

Figure 6:
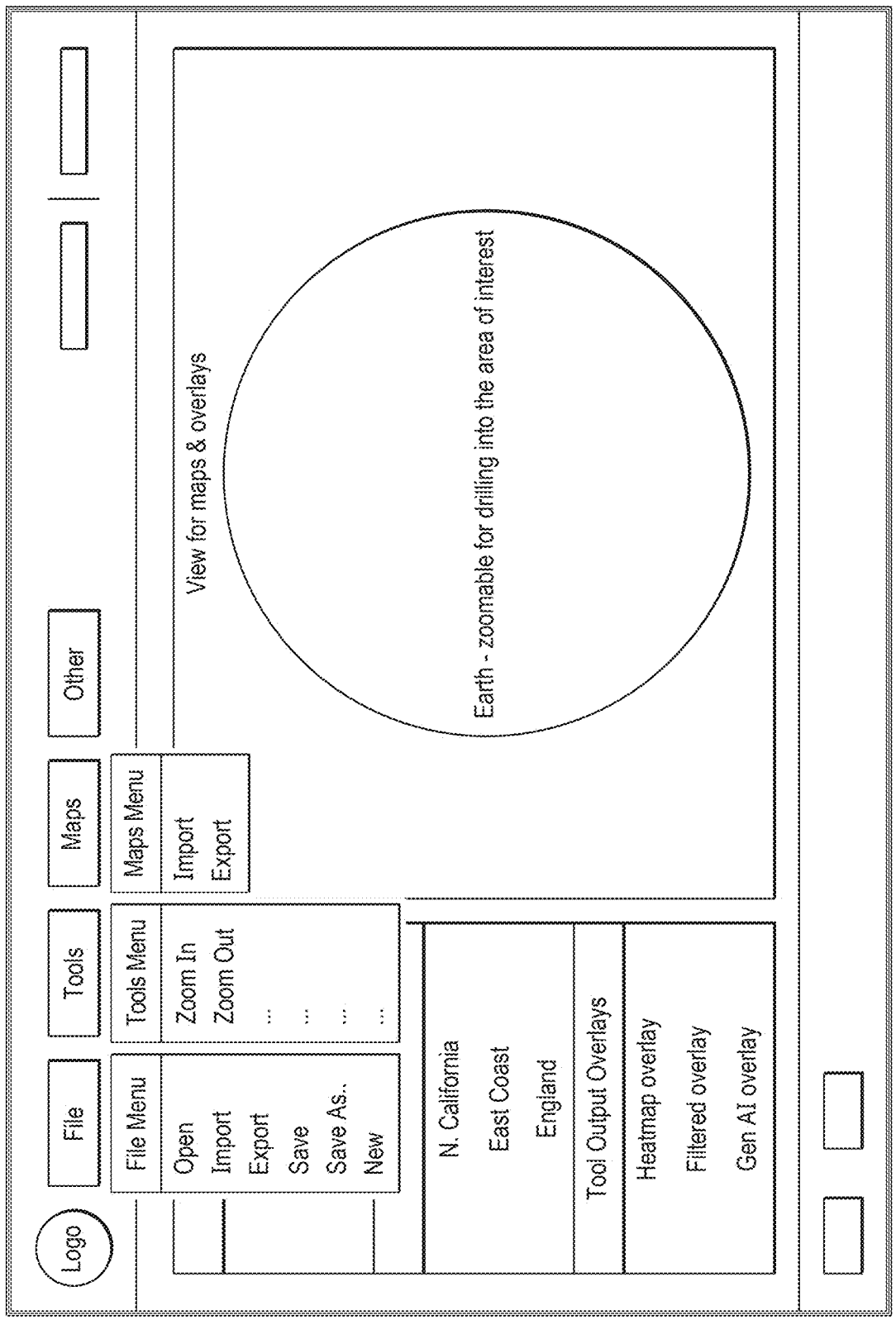
FIG. 6 illustrates an example of a more detailed view of the GUI in FIG. 5, according to some implementations.

FIG. 6 illustrates an example of a more detailed view of the GUI in FIG. 5.

The file menu provides tools to process different map formats that have been developed over the history of the maps. "Import", "Export", and "New" are in reference to map projects in "Modified Maps". The file menu allows sharing of map projects between users and creation of new projects. "Open", "Save", and "Save As" options follow the standard operations.

The tools menu contains tools for working with and manipulating the maps. The tools in the tools menu can include zooming in/out and other operations, and can be part of a floating toolbar shown in FIG. 7 and discussed in greater detail below.

The maps menu includes the "Import" and "Export" features. The "Import" feature can allow the user to import from different map formats into a selected baseline format, which can be a standard format or a format developed by the user. The import process can bring up a window that can allow the user to add metadata about the map. Once relevant metadata has been added, the map can be converted, stored (e.g., in a cloud-based location, a network, or locally), and/or added to a database (e.g., a cloud-based, network, or local database). Imported maps can be added to the "Original Maps" section (viewable in FIG. 5). The "Export" feature can provide the user with a variety of options. The user can export a map to a common map format or export a map that is compatible with a format defined by the user. The "Export" feature can include performing upwards continuation to altitudes of interest and then saving the results to a destination (e.g., a cloud-based location, a network, or local destination).

Figure 7:
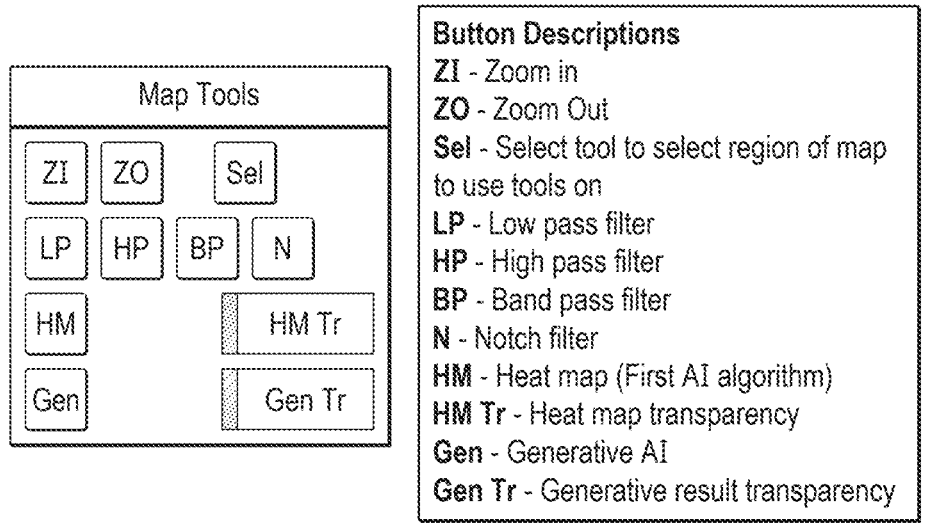
FIG. 7 illustrates an example toolbar with various operations that can be applied to a selected region of a map, according to some implementations.

FIG. 7 illustrates an example toolbar with various operations that can be applied to a selected region of a map.

ZI and ZO allow the user to zoom in and out of the map.

Sel enables a select tool to select a region of the map that the user can apply tools to. The region can be the entire map area, or just a subset of interest.

LP, HP, BP, and N are filters that can be applied to the selected region. The different filtering operations can form overlays that show up in the "Tool Output Overlays" described earlier.

HM represents the heat map from 102 and is a visual representation of the probability of an area of the selected region being an artifact.

HM Tr is a "Heatmap Transparency" slider that can allow the heat map to become more transparent so the user can see the underlying region through the heat map.

Gen enables the second machine learning model from 104 to be applied to the selected region and propose fixes to the anomalies present in the map.

Gen Tr is a slider that allows the user to change the transparency of the generated fixes and see the underlying/original map.

Figure 8:
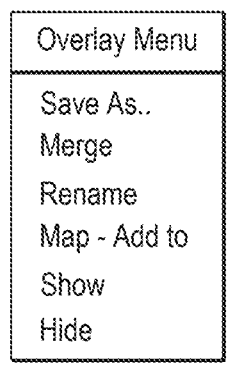
FIG. 8 illustrates an example overlay menu, according to some implementations.

FIG. 8 illustrates an example overlay menu. In some implementations, the overlay menu can show up from a right click over an item in a list within the overlay section.

Merge can select and merge several overlays into a single entity. Rename can update the name of an overlay. "Map-Add to" can associate an overlay with one or more projects. Show can enable an overlay to be displayed in the central viewing area. Hide can disable/hide an overlay from the central viewing area. Hide All (not shown in FIG. 8) can hide all the overlays in the central viewing area.

Figure 9:
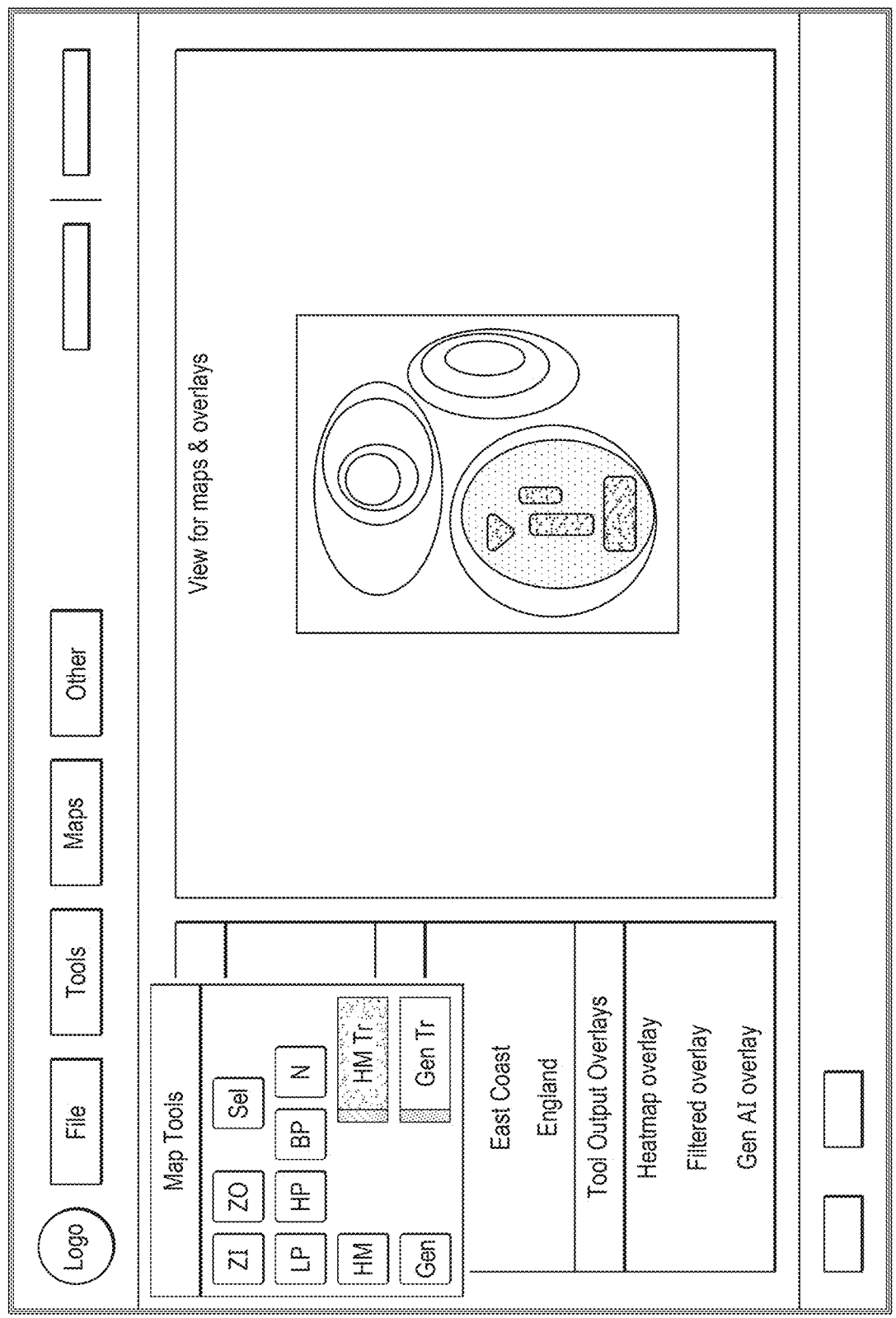
FIG. 9 illustrates an example of a heat map being executed on a selected region, according to some implementations.

FIG. 9 illustrates an example of a heat map being executed on a selected region. The shaded regions show the output from the machine learning model at 102, where the intensity level in the shaded regions correlates with the predicted level of artifacts identified in the map.

Figure 10:
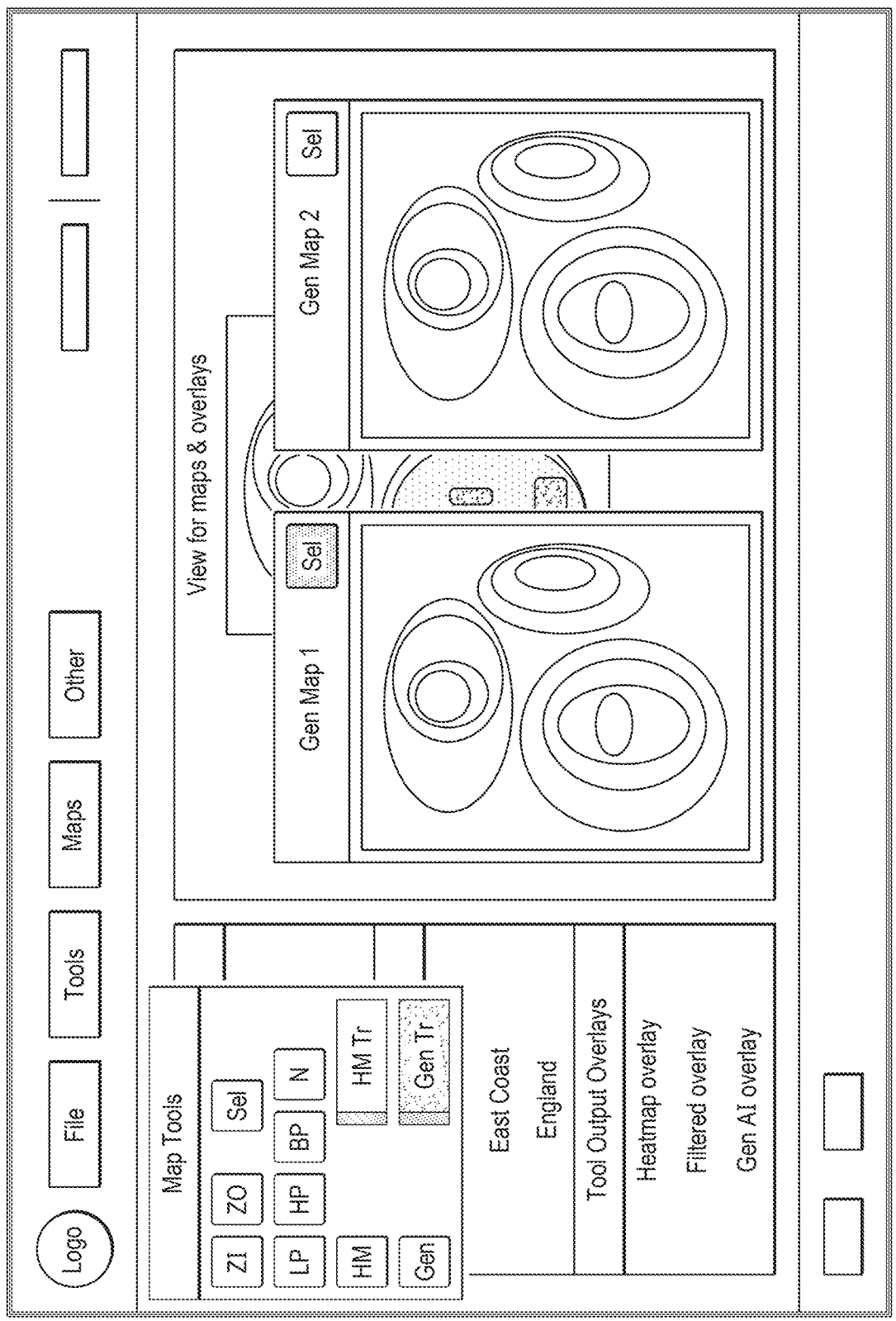
FIG. 10 illustrates an example of two output maps from the second machine learning model at 104 in FIG. 1, according to some implementations.

FIG. 10 illustrates an example of two output maps from the second machine learning model at 104 in FIG. 1. A user (e.g., an expert) can evaluate the two maps and then, by using the button in the upper right corner of each map, select which map is closer to reality.

Figure 11:
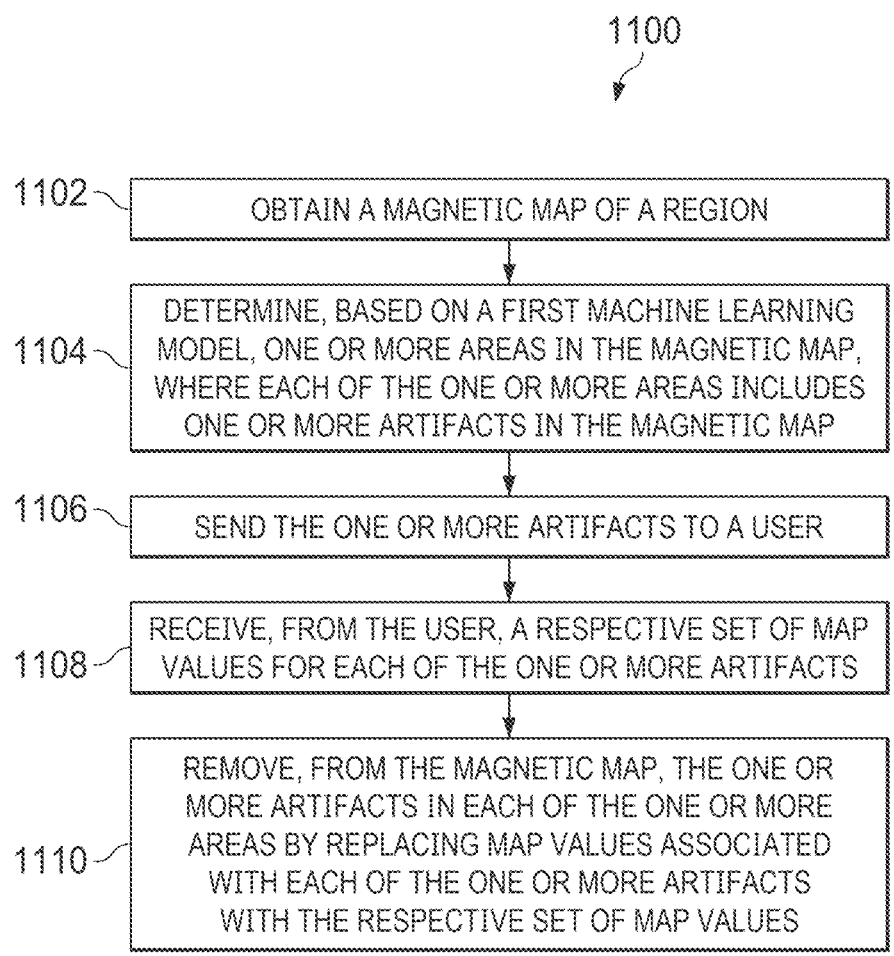
FIG. 11 illustrates an example process for estimating geophysical fields for magnetic navigation, according to some implementations.

FIG. 11 illustrates an example process 1100 for detecting and fixing map artifacts. For convenience, process 1100 will be described as being performed by a computer system having one or more computers located in one or more locations and programmed appropriately in accordance with this specification. An example of the computer system is the computer system 1200 illustrated in FIG. 12.

At 1102, a computer system obtains a magnetic map of a region.

At 1104, the computer system determines, based on a first machine learning model, one or more areas in the magnetic map, where each of the one or more areas includes one or more artifacts in the magnetic map.

At 1106, the computer system sends the one or more artifacts to a user.

At 1108, the computer system receives, from the user, the respective set of revised map values for each of the one or more artifacts.

At 1110, the computer system removes, from the magnetic map, the one or more artifacts in each of the one or more areas by replacing map values associated with each of the one or more artifacts with a respective set of revised map values.

Figure 12:
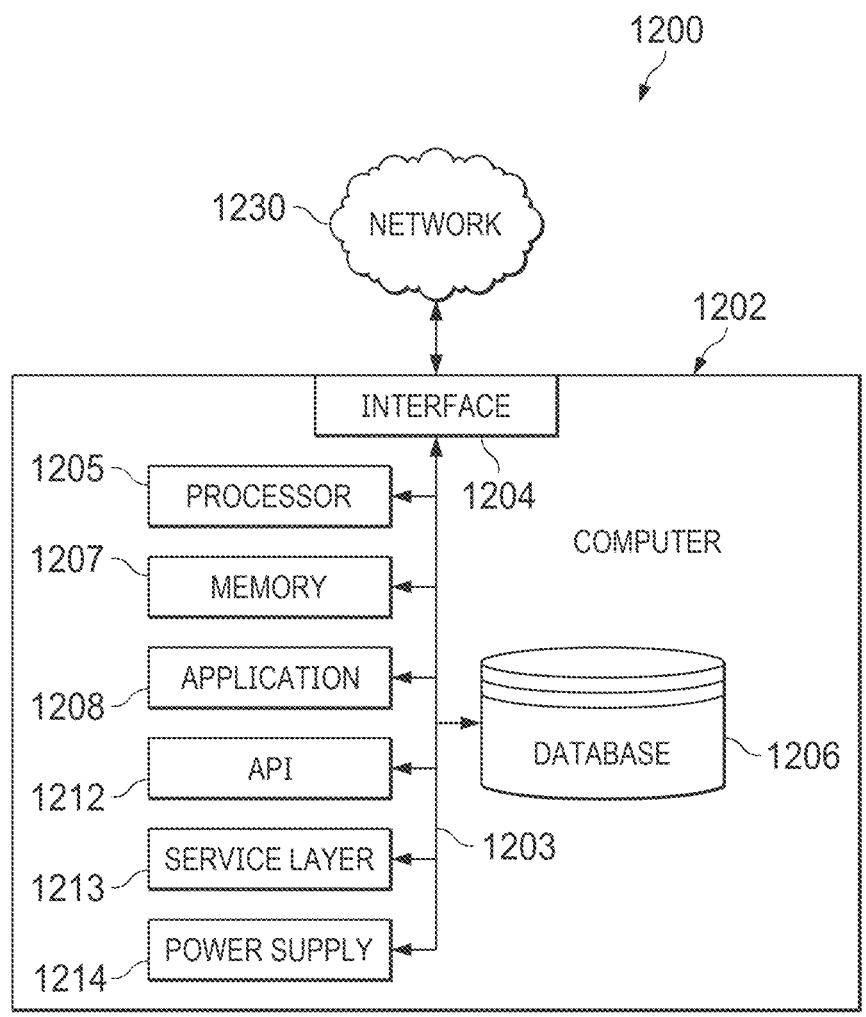
FIG. 12 is a block diagram of an example computer system that can be used to provide computational functionalities associated with described algorithms, methods, functions, processes, flows, and procedures, according to some implementations.

FIG. 12 is a block diagram of an example computer system 1200 that can be used to provide computational functionalities associated with described algorithms, methods, functions, processes, flows, and procedures, according to some implementations. In some implementations, the computer system performing process 200 or 400 can be the computer system 1200 or the computer 1202, include the computer system 1200 or the computer 1202, or the computer system performing process 200 or 400 can communicate with the computer system 1200.

The illustrated computer 1202 is intended to encompass any computing device such as a server, a desktop computer, an embedded computer, a laptop/notebook computer, a wireless data port, a smart phone, a personal data assistant (PDA), a tablet computing device, or one or more processors within these devices, including physical instances, virtual instances, or both. The computer 1202 can include input devices such as keypads, keyboards, and touch screens that can accept user information. Also, the computer 1202 can include output devices that can convey information associated with the operation of the computer 1202. The information can include digital data, visual data, audio information, or a combination of information. The information can be presented in a graphical user interface (UI) (or GUI). In some implementations, the inputs and outputs include display ports (such as DVI-I+2x display ports), USB 3.0, GbE ports, isolated DI/O, SATA-III (6.0 Gb/s) ports, mPCIe slots, a combination of these, or other ports. In instances of an edge gateway, the computer 1202 can include a Smart Embedded Management Agent (SEMA), such as a built-in ADLINK SEMA 2.2, and a video sync technology, such as Quick Sync Video technology supported by ADLINK MSDK+. In some examples, the computer 1202 can include the MXE-5400 Series processor-based fanless embedded computer by ADLINK, though the computer 1202 can take other forms or include other components.

The computer 1202 can serve in a role as a client, a network component, a server, a database, a persistency, or components of a computer system for performing the subject matter described in the present disclosure. The illustrated computer 1202 is communicably coupled with a network 1230. In some implementations, one or more components of the computer 1202 can be configured to operate within different environments, including cloud-computing-based environments, local environments, global environments, and combinations of environments.

At a high level, the computer 1202 is an electronic computing device operable to receive, transmit, process, store, and manage data and information associated with the described subject matter. According to some implementations, the computer 1202 can also include, or be communicably coupled with, an application server, an email server, a web server, a caching server, a streaming data server, or a combination of servers.

The computer 1202 can receive requests over network 1230 from a client application (for example, executing on another computer 1202). The computer 1202 can respond to the received requests by processing the received requests using software applications. Requests can also be sent to the computer 1202 from internal users (for example, from a command console), external (or third) parties, automated applications, entities, individuals, systems, and computers.

Each of the components of the computer 1202 can communicate using a system bus 1203. In some implementations, any or all of the components of the computer 1202, including hardware or software components, can interface with each other or the interface 1204 (or a combination of both), over the system bus. Interfaces can use an application programming interface (API) 1212, a service layer 1213, or a combination of the API 1212 and service layer 1213. The API 1212 can include specifications for routines, data structures, and object classes. The API 1212 can be either computer-language independent or dependent. The API 1212 can refer to a complete interface, a single function, or a set of APIs 1212.

The service layer 1213 can provide software services to the computer 1202 and other components (whether illustrated or not) that are communicably coupled to the computer 1202. The functionality of the computer 1202 can be accessible for all service consumers using this service layer 1213. Software services, such as those provided by the service layer 1213, can provide reusable, defined functionalities through a defined interface. For example, the interface can be software written in JAVA, C++, or a language providing data in extensible markup language (XML) format. While illustrated as an integrated component of the computer 1202, in alternative implementations, the API 1212 or the service layer 1213 can be stand-alone components in relation to other components of the computer 1202 and other components communicably coupled to the computer 1202. Moreover, any or all parts of the API 1212 or the service layer 1213 can be implemented as child or submodules of another software module, enterprise application, or hardware module without departing from the scope of the present disclosure.

The computer 1202 can include an interface 1204. Although illustrated as a single interface 1204 in FIG. 12, two or more interfaces 1204 can be used according to particular needs, desires, or particular implementations of the computer 1202 and the described functionality. The interface 1204 can be used by the computer 1202 for communicating with other systems that are connected to the network 1230 (whether illustrated or not) in a distributed environment. Generally, the interface 1204 can include, or be implemented using, logic encoded in software or hardware (or a combination of software and hardware) operable to communicate with the network 1230. More specifically, the interface 1204 can include software supporting one or more communication protocols associated with communications. As such, the network 1230 or the interface's hardware can be operable to communicate physical signals within and outside of the illustrated computer 1202.

The computer 1202 includes a processor 1205. Although illustrated as a single processor 1205 in FIG. 12, two or more processors 1205 can be used according to particular needs, desires, or particular implementations of the computer 1202 and the described functionality. Generally, the processor 1205 can execute instructions and manipulate data to perform the operations of the computer 1202, including operations using algorithms, methods, functions, processes, flows, and procedures as described in the present disclosure.

The computer 1202 can also include a database 1206 that can hold data for the computer 1202 and other components connected to the network 1230 (whether illustrated or not). For example, database 1206 can be an in-memory, conventional, or a database storing data consistent with the present disclosure. In some implementations, the database 1206 can be a combination of two or more different database types (for example, hybrid in-memory and conventional databases) according to particular needs, desires, or particular implementations of the computer 1202 and the described functionality. Although illustrated as a single database 1206 in FIG. 12, two or more databases (of the same, different, or combination of types) can be used according to particular needs, desires, or particular implementations of the computer 1202 and the described functionality. While database 1206 is illustrated as an internal component of the computer 1202, in alternative implementations, database 1206 can be external to the computer 1202.

The computer 1202 also includes a memory 1207 that can hold data for the computer 1202 or a combination of components connected to the network 1230 (whether illustrated or not). Memory 1207 can store any data consistent with the present disclosure. In some implementations, memory 1207 can be a combination of two or more different types of memory (for example, a combination of semiconductor and magnetic storage) according to particular needs, desires, or particular implementations of the computer 1202 and the described functionality. Although illustrated as a single memory 1207 in FIG. 12, two or more memories 1207 (of the same, different, or combination of types) can be used according to particular needs, desires, or particular implementations of the computer 1202 and the described functionality. While memory 1207 is illustrated as an internal component of the computer 1202, in alternative implementations, memory 1207 can be external to the computer 1202.

An application 1208 can be an algorithmic software engine providing functionality according to particular needs, desires, or particular implementations of the computer 1202 and the described functionality. For example, an application 1208 can serve as one or more components, modules, or applications 1208. Multiple applications 1208 can be implemented on the computer 1202. Each application 1208 can be internal or external to the computer 1202.

The computer 1202 can also include a power supply 1214. The power supply 1214 can include a rechargeable or non-rechargeable battery that can be configured to be either user- or non-user-replaceable. In some implementations, the power supply 1214 can include power-conversion and management circuits, including recharging, standby, and power management functionalities. In some implementations, the power-supply 1214 can include a power plug to allow the computer 1202 to be plugged into a wall socket or a power source to, for example, power the computer 1202 or recharge a rechargeable battery.

There can be any number of computers 1202 associated with, or external to, a computer system including computer 1202, with each computer 1202 communicating over network 1230. Further, the terms "client", "user", and other appropriate terminology can be used interchangeably without departing from the scope of the present disclosure. Moreover, the present disclosure contemplates that many users can use one computer 1202 and one user can use multiple computers 1202.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method, comprising:
   obtaining a first geophysical magnetic map of a navigable region of the earth;
   determining, based on a first machine learning model, one or more areas in the first geophysical magnetic map, wherein each of the one or more areas includes one or more artifacts in the first geophysical magnetic map, and determining the one or more areas comprises:
   generating, based on the first machine learning model and the magnetic map, a second geophysical magnetic map by the first machine learning model; and
   comparing the second geophysical magnetic map with the first geophysical magnetic map to determine the one or more areas; and
   removing, from the first geophysical magnetic map, the one or more artifacts in each of the one or more areas, wherein removing the one or more artifacts comprises;
   determining, based on a second machine learning model, a respective set of revised map values for at least one of the one or more artifacts; and
   replacing the map values associated with at least one of the one or more artifacts with the respective set of revised map values,
   wherein the second machine learning model comprises a variational autoencoder that takes as input first geophysical magnetic map data and processes the one or more artifacts in the first geophysical magnetic map to generate the respective set of revised geophysical magnetic map values for the at least one of the one or more artifacts.

2. The method according to claim 1, further comprises training the second machine learning model based on a plurality of magnetic maps that are free of artifacts and a plurality of magnetic maps that include artifacts.

3. The method according to claim 1, further comprising:
   sending the respective set of revised map values for each of the one or more artifacts to a user;
   receiving, from the user, a respective second set of revised map values for each of the one or more artifacts; and
   re-training the second machine learning model based on the respective second set of revised map values for each of the one or more artifacts.

4. The method according to claim 1, wherein an input to the first machine learning model comprises the magnetic map and at least one of a topographic map or a gravity-based map of the region.

5. The method according to claim 1, wherein an output from the first machine learning model comprises the one or more areas or metadata associated with the one or more areas.

6. The method according to claim 1, further comprising:
   sending the one or more artifacts to a user; and
   receiving, from the user, the respective set of revised map values for each of the one or more artifacts.

7. The method according to claim 6, wherein sending the one or more artifacts to the user comprises displaying on a graphic user interface (GUI) the one or more artifacts.

8. The method according to claim 1, wherein the second machine learning model comprises a generative adversarial network (GAN) that processes the one or more artifacts in the magnetic map to generate the respective set of revised map values for each of the one or more artifacts.

9. The method according to claim 8, further comprises:
   generating a plurality of synthetic magnetic maps based on the magnetic map of the region and a plurality of simulated artifacts; and
   training the GAN based on the plurality of synthetic magnetic maps.

10. The method according to claim 1, wherein the first machine learning model comprises an autoencoder, the autoencoder comprises a plurality of encoding blocks and a plurality of decoding blocks, and determining the one or more areas comprises processing, based on the plurality of encoding blocks and the plurality of decoding blocks, the magnetic map to determine the one or more areas.

11. The method according to claim 10, wherein the autoencoder is based on a convolutional neural network (CNN).

12. The method according to claim 10, further comprises training the first machine learning model based on a plurality of magnetic maps that are free of artifacts and a plurality of magnetic maps that include artifacts.

13. The method according to claim 10, wherein a loss function of the autoencoder comprises a similarity-based loss function.

14. The method according to claim 13, wherein the similarity-based loss function comprises a structure-based similarity index or a feature-based similarity index.

15. A system, comprising:
one or more processors; and
a non-transitory computer readable medium coupled to the one or more processors and storing instructions that, when executed by the one or more processors, cause the system to perform operations comprising:
  obtaining a first geophysical magnetic map of a navigable region of the earth;
  determining, based on a first machine learning model, one or more areas in the first geophysical magnetic map, wherein each of the one or more areas includes one or more artifacts in the first geophysical magnetic map, and determining the one or more areas comprises:
    generating, based on the first machine learning model and the magnetic map, a second geophysical magnetic map by the first machine learning model; and
    comparing the second geophysical magnetic map with the first geophysical magnetic map to determine the one or more areas; and
  removing, from the first geophysical magnetic map, the one or more artifacts in each of the one or more areas, wherein removing the one or more artifacts comprises;
    determining, based on a second machine learning model, a respective set of revised map values for at least one of the one or more artifacts; and
    replacing the map values associated with at least one of the one or more artifacts with the respective set of revised map values,
  wherein the second machine learning model comprises a variational autoencoder that takes as input first geophysical magnetic map data and processes the one or more artifacts in the first geophysical magnetic map to generate the respective set of revised geophysical magnetic map values for the at least one of the one or more artifacts.

16. The system according to claim 15, wherein removing the one or more artifacts comprises replacing map values associated with each of the one or more artifacts with a respective set of revised map values.

17. An artifact-free geophysical magnetic map without artifact magnitudes above a specified threshold made by a process, the process comprising:
  obtaining a first geophysical magnetic map of a navigable region of the earth;
  determining, based on a first machine learning model, one or more areas in the first geophysical magnetic map, wherein each of the one or more areas includes one or more artifacts in the first geophysical magnetic map, and determining the one or more areas comprises:
    generating, based on the first machine learning model and the magnetic map, a second geophysical magnetic map by the first machine learning model; and
    comparing the second geophysical magnetic map with the first geophysical magnetic map to determine the one or more areas; and
  generating the artifact-free geophysical magnetic map by removing, from the first geophysical magnetic map, the one or more artifacts in each of the one or more areas, wherein removing the one or more artifacts comprises;
    determining, based on a second machine learning model, a respective set of revised map values for at least one of the one or more artifacts; and
    replacing the map values associated with at least one of the one or more artifacts with the respective set of revised map values,
  wherein the second machine learning model comprises a variational autoencoder that takes as input first geophysical magnetic map data and processes the one or more artifacts in the first geophysical magnetic map to generate the respective set of revised geophysical magnetic map values for the at least one of the one or more artifacts.

* * * * *